Feb. 4, 1969     F. R. HOLYCROSS, JR     3,425,660
FAUCET VALVE
Filed Aug. 17, 1966     Sheet 1 of 2
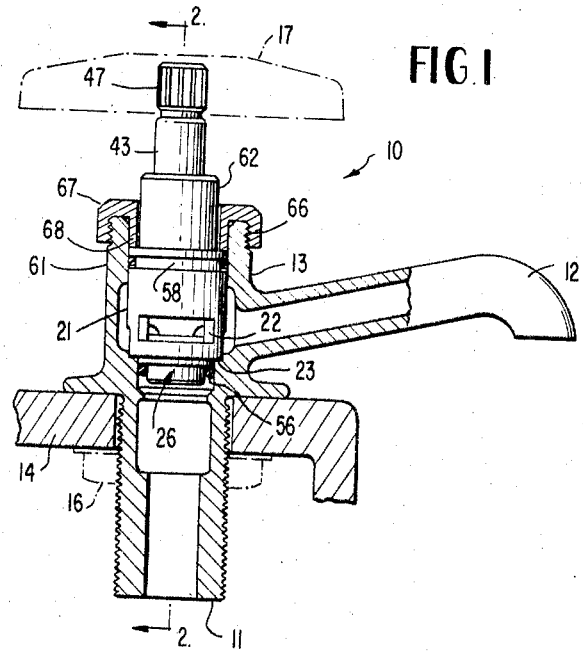
FIG. 1
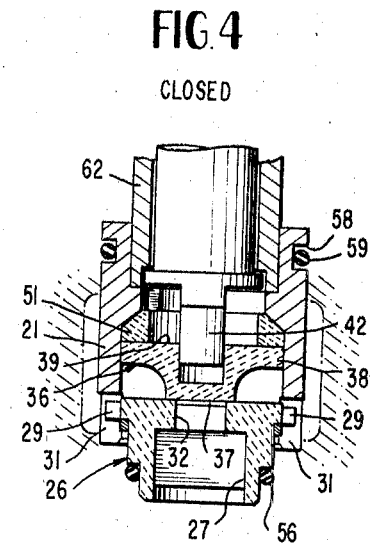
FIG. 4 CLOSED
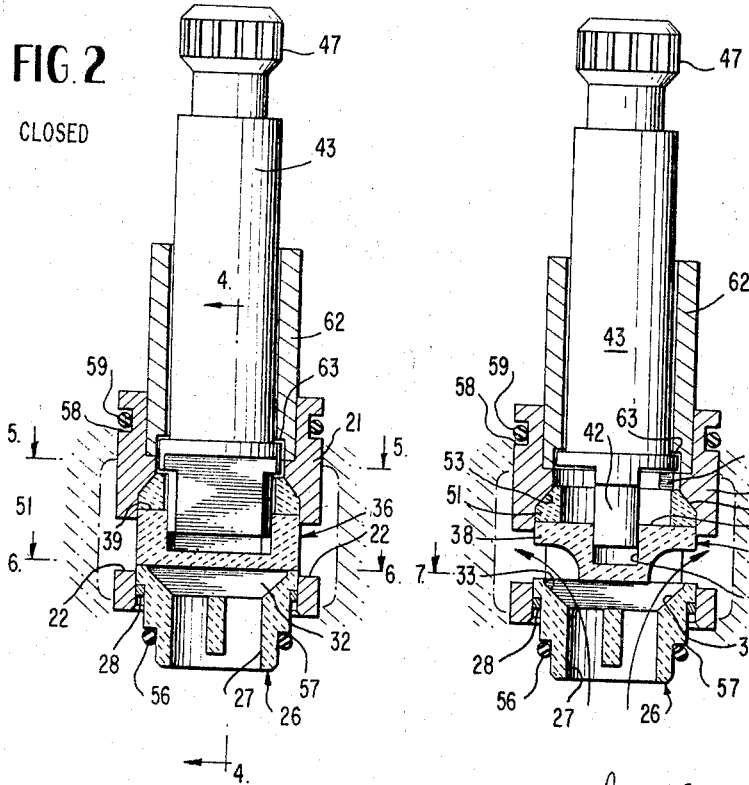
FIG. 2 CLOSED
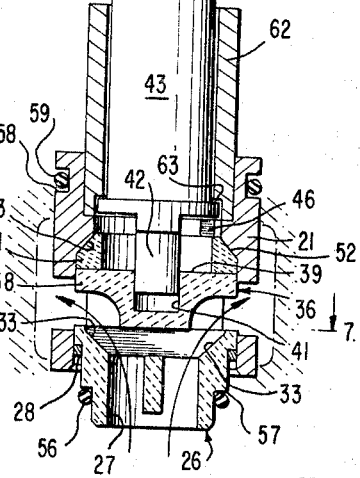
FIG. 3 OPEN
INVENTOR
FRANK R. HOLYCROSS, JR.
BY Irons, Birch, Swindler & McKie
ATTORNEYS Feb. 4, 1969  F. R. HOLYCROSS, JR  3,425,660
FAUCET VALVE
Filed Aug. 17, 1966   Sheet 2 of 2
FIG. 5  FIG. 6  FIG. 7
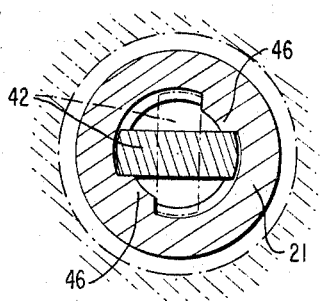
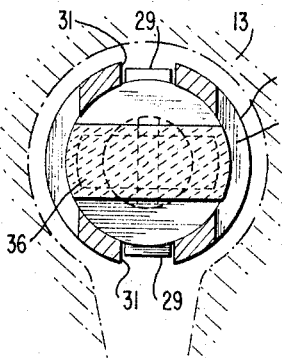
CLOSED
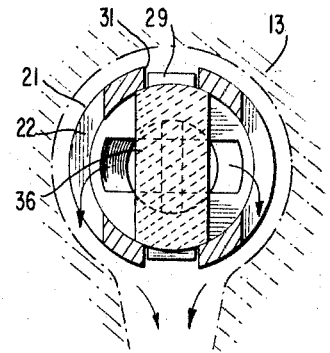
OPEN
FIG. 8
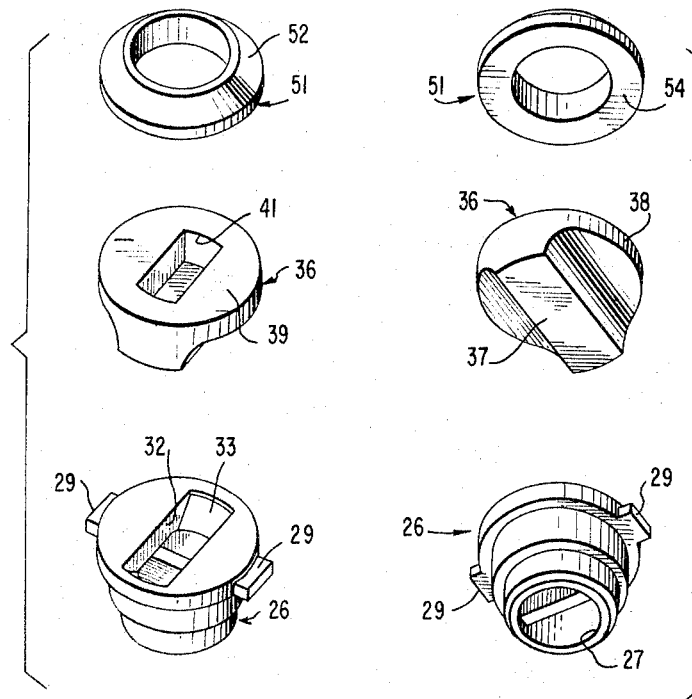
FIG. 9
INVENTOR
FRANK R. HOLYCROSS, JR.
BY Irons, Birch, Swindler & McKie
ATTORNEYS

United States Patent Office
3,425,660
Patented Feb. 4, 1969

1

3,425,660
FAUCET VALVE
Frank R. Holycross, Jr., Royal Oak, Mich., assignor to Wallace-Murray Corporation, Pittsburgh, Pa., a corporation of Delaware
Filed Aug. 17, 1966, Ser. No. 573,031
U.S. Cl. 251—172
Int. Cl. F16k 25/02, 5/04, 31/50
14 Claims

ABSTRACT OF THE DISCLOSURE

The invention relates to a valve particularly adapted for plumbing-ware faucet use, the faucet including a body having a pressure inlet and a liquid outlet. Mounted inside the body is a generally cylindrically shaped housing having at least one opening in the wall thereof through which fluid can flow to the outlet. A valve seat having a central passageway which communicates with the pressure inlet, is loosely mounted adjacent the bottom, inlet end of the housing. A valve closure member is rotatably mounted above the valve seat to be movable from a first position wherein the passageway is totally closed to a second position wherein the passageway has a maximum opening which communicates with the housing opening. The valve seat and the valve closure member have smoothly polished mating surfaces so that the fluid pressure acting on the inlet side of the valve seat is sufficient alone to provide a seal therebetween when the valve is in the closed position. A sealing device is also provided above the closure member for effecting a seal between the downstream side of the valve closure member and the housing. Facilities are also provided for connecting the valve closure member to an actuator which can be hand operated.

In a further embodiment of the invention the sealing device is an annular sealing ring which is permanently secured within the housing. The valve seat, the valve closure member and the sealing ring are preferably made of a high alumina ceramic which is highly resistant to wear and corrosion. The mating surfaces of those three members are smoothly polished and in the assembled faucet are pressed into sealing engagement with one another solely by the fluid pressure acting thereon.

State of the prior art

In the past, non-rise valves of the type used in faucets, for example, generally have required a packing to prevent leakage between the interior and exterior of the valve body, particularly around the valve stem. Such packings are subject to wear and must in time be replaced. It has also been common to provide a spring or other resilient device to hold the valve closure and the valve seat in contacting relationship. This apparently was necessary so that the valve could be positively closed between the pressure inlet and the outlet. Additionally, conventional valve closures would wear or deteriorate and thereupon have to be replaced. These features tended to make assembly and disassembly of the valve difficult and increased the likelihood of an improper assembly of the parts.

Objects

Accordingly, it is the primary object of this invention to provide a valve which has a minimum of elemental parts alowing rapid assembly and disassembly of the valve.

Another object of the invention is to provide a valve having a stationary, annular ring for sealing between the interior and exterior of the valve body particularly against leakage between the movable valve stem and valve housing.

2

Still another object of the invention is to provide a flow regulator wherein the interior valving and sealing members are held in sealing engagement with one another solely by the pressure of the fluid being regulated.

Drawings

The invention will now be more fully described in conjunction with an operative embodiment thereof shown in the accompanying drawings wherein:

FIG. 1 is an axial section taken through a faucet incorporating the invention with parts of the valve shown in elevation;

FIG. 2 is a cross-sectional view taken along line 2—2 of FIG. 1 and showing the valve in its CLOSED position;

FIG. 3 is a view identical to FIG. 2 but with the operative parts of the valve turned 90° to an OPEN position;

FIG. 4 is a cross-sectional view taken along line 4—4 of FIG. 2 showing the valve in its CLOSED position;

FIG. 5 is a cross-sectional view taken along line 5—5 of FIG. 2 and showing the valve stem in its CLOSED (solid lines) and OPEN (phantom lines) positions;

FIG. 6 is a cross-sectional view taken along line 6—6 of FIG. 2 and showing a valve in its CLOSED position on a valve seat;

FIG. 7 is a cross-sectional view taken along line 7—7 of FIG. 3 and showing the valve in its OPEN position on the valve seat;

FIG. 8 is an exploded, top perspective view of the valve, valve seat, and sealing member; and FIG. 9 is an exploded, bottom perspective view of the elements shown in FIG. 8.

Description of the invention

In FIG. 1 there is shown a faucet designated generally 10 which includes a liquid inlet 11 and an outlet spout 12. The faucet 10 includes a body 13 which is secured in the opening of an apron or support 14 by a nut 16 and is regulated by a handle 17, the nut 16 and handle 17 being shown in phantom.

In FIGS. 1–4 there is shown a valve housing 21 mounted within the faucet body 13. The housing 21 is generally cylindrical in shape and has openings 22—22 in its side walls, through which liquid may pass outwardly into the faucet body 13 and thence through spout 12. The housing 21 is seated on a shoulder 23 of the body 13.

A valve seat 26 having a central passageway 27 therethrough is loosely mounted in the lower portion of the housing 21 by a snap ring 28. The snap ring serves principally to keep the parts assembled during handling prior to inserting the valve unit in faucet body 13 since, when mounted in the formation of the cavity, the shoulder 23 of the faucet body 13 prevents the parts from separating and also the liquid pressure urges the parts up into valve housing 21.

Passageway 27 has a strainer bar 27a extending diametrically thereof. This bar is important in prohibiting particles of too large a size from becoming lodged between valve seat 26 and the valve closure member mentioned hereinafter. A large particle passing through passageway 27 could hold the valve open and cause damage to the smoothly finished parts of the valve. The passageway 27 is reduced at its upper end to a generally rectangular opening 32, the short sides of which are sloping as shown at 33—33 (see FIGS. 2, 3 and 8). The valve seat 26 has a pair of positioning lugs 29—29 (FIGS. 2, 6 and 7) which are slidably received in complementary notches 31—31 formed in the housing 21.

The valve seat 26 cooperates with a valve closure member 36 mounted above the seat 26 for opening and closing the opening 32. The closure member 36 has a lower rectangular bottom 37 slightly longer and wider than the opening 32. When the member 36 is positioned as shown in FIGS. 2 and 4, the opening 32 is completely closed; and when in the position shown in FIG. 3, a maximum amount of liquid is permitted to pass (see arrows FIG. 3). Under the effect of liquid pressure the seat 26 and member 36 at all times remain in contact with each other.

The closure member 36 flares outwardly from its rectangular bottom 37 to a circular top portion 38 having a diameter slightly less than that of the interior of the housing 21 and providing a sealing surface 39. The member 36 also has a central, upwardly exposed keyway 41 (FIG. 8) for receiving a key 42 formed on the lower end of a valve stem 43. The key and valve stem on which it is carried are rotatable through approximately 90° to open and close the valve. Inwardly projecting abutments 46—46 on the interior of housing 21 prevent further rotation of the valve stem 43 by engaging with key 42. The upper end of the stem 43 is splined, shown as 47 (FIG. 1) for receiving and engaging the handle 17.

In order to provide a seal between the interior of the valve housing 21 and the closure member and valve stem 43, there is provided an annular sealing ring 51 (FIGS. 2–4, 8 and 9). The ring has an upper tapered surface 52 which is permanently secured to a complementary surface 53 within housing 21. This attachment may be made by a suitable epoxy, for example, so that a permanent and liquid imprevious barrier is provided between the ring 51 and housing 21. The ring 51 has a flat bottom surface 54 which contacts the upper surface 39 of the closure member 36 and is polished to a high degree of smoothness to sealingly cooperate with this surface of member 36.

The valve closure member 36, the valve seat 26 and the sealing ring 51 are all preferably made of a hard, wear and corrosion resistant material, such as a high alumina ceramic, which is capable of being polished to be extremely smooth and flat. Thus, in order to provide an effective seal between these parts, their mating surfaces are polished to a high degree so that they slidingly cooprate to prevent the passage of liquid therebetween. This includes (FIGS. 8 and 9) the upper surface of the valve seat 26, the surfaces of the rectangular bottom 37 and the circular top portion 38 of the valve closure member 36, and the bottom surface 54 of the sealing ring 51. It should be noted that the above identified mating surfaces are held together in sealing relationship only by the force which the liquid pressure in inlet 11 exerts thereon.

In particular, the fluid acts on the lower, exposed horizontal surfaces of the valve seat 26 to urge the seat 26 up against the valve closure member 36. Also, when the valve is closed, nearly the entire bottom surface of rectangular bottom 37 of the closure member 36 is exposed to the liquid pressure and the closure member is urged upwardly into firm contact with the sealing ring 51. When the valve is wide open, the lower surface of the closure member still presents a substantial area to the fluid which is sufficient to insure against leakage between ring 51 and closure member 36. The contacting surfaces 39 and 54 are generally normal to the direction of flow and accordingly receive nearly the entire vector force of the liquid which is acting on the valve closure member 36. This construction eliminates the need for a packing gland or an O-ring between these relatively movable parts to stop leakage around the valve stem 43 and also eliminates the need for an additional force applying member, such as a spring to hold the parts in place. It also permits the stem 43 to be removed without breaking the seal between surfaces 39 and 54.

In order to effect fluid sealing in other areas, but where relative movement between the parts and consequent wear of the seal is not encountered in use of the valve, conventional O-rings are used. Thus, an O-ring 56 (FIGS. 2–4) is positioned around the lower portion of the valve seat 26 against a shoulder 57 to provide a peripheral seal between the seat 26 and the faucet body 13. The valve housing 21 is provided with an exterior groove 58 (FIGS. 2–4) in which there is positioned an O-ring 59. The O-ring 59 cooperates with a collar portion 61 of the faucet body 13 to provide a peripheral seal therebetween. Both of these O-ring seals are of course stationary once the valve unit is positioned within faucet body 13 and are thus not subject to wear as the faucet is opened and closed. As will be apparent the O-ring 56 is of particular importance in stopping flow between valve seat 26 and faucet body 13 such that pressure build-up holds the valve seat in firm sealing engagement with valve element 38 when the valve is under operating pressure.

In order to maintain the axial alignment of the valve stem 43, there is provided a bushing 62 (FIGS. 1–4) which may be press fitted into the upper end of the valve housing 21. The bushing 62 has a shoulder 63 which holds the valve stem 43 in place. If the bushing 62 be removed to permit removal and replacement of the valve stem 43 it will be noted that this in no way disturbs the seal between surfaces 39 and 54.

As illustrated, the faucet body 13 is exteriorly threaded at 66 (FIG. 1) for receiving an internally threaded retainer cap 67. The cap 67 has an inner, annular skirt 68, the lower end of which engages and holds the valve housing 21 down against the shoulder 23 of the faucet body 13. Removal of the cap 67 permits the entire valve housing 21 and the parts held therein to be withdrawn from the faucet body 13 as a unit.

It is to be understood that the above-described arrangements of apparatus and construction of elemental parts are simply illustrative of an application of the principles of the invention, and that many other modifications and variations may be made without departing from the invention.

I claim:
1. A faucet valve which comprises:
   a valve body having a liquid inlet and an outlet;
   a housing mounted inside the body and having at least one opening in the wall thereof through which liquid can flow into the outlet;
   a valve seat loosely mounted in the bottom inlet end of the housing, said seat having a central passageway communicating with the liquid inlet;
   a valve closure member rotatably mounted on the valve seat and movable from a first position wherein the passageway is totally closed to a second position wherein the passageway has a maximum opening which communicates with the housing opening;
   said valve seat and valve closure member having smoothly polished mating surfaces so that liquid pressure acting on the inlet side of the valve seat is sufficient alone to provide a seal therebetween when the valve is in the closed position;
   seal means between the downstream side of the valve closure member and said housing; and
   manually operable means connected to said valve closure member for moving the member between its first and second positions.
2. A faucet valve as recited in claim 1 wherein:
   said valve closure member is provided with a female coupling element in the form of a central recess on the downstream side of the member; and
   said manually operable means includes a valve stem having a male coupling member at one end for driving engagement with the female coupling element.
3. A faucet valve as recited in claim 2 wherein said housing includes:
   diametrically opposed inner radical enlargements, said male coupling member being rotatable from a closed position where the member engages a first one of said enlargements to a fully open position where the member engages the second of said enlargements.
4. A faucet valve as recited in claim 2 wherein:
   said seal means between the valve closure member and the housing includes a smoothly polished annular surface on the downstream side of said valve member and a ring shaped seal permanently secured to the interior wall of the housing to provide a liquid impervious barrier between the ring and housing, said ring shaped seal having a smoothly polished annular surface which contacts and forms a seal with said annular surface of the valve closure member under the pressure exerted thereon by the valve seat and the liquid pressure.

5. A faucet valve as recited in claim 4 wherein said ring shaped seal is concentric to the male coupling member and radially spacd therefrom so that the member is freely rotatable therein.

6. A faucet valve as recited in claim 4 wherein the contacting surfaces of said ring shaped seal and said valve closure member are substantially normal to the vector force of the liquid pressure acting thereon.

7. A faucet valve as recited in claim 4 wherein the valve seat, the valve closure member and the ring shaped seal are made of ceramic material.

8. A faucet valve as recited in claim 2 which further includes:
- a bushing secured in the upper end of the housing in which said valve stem is freely rotatable, said bushing having a shoulder portion engaging and retaining the stem in position.

9. A valve for a faucet body provided with a liquid inlet and an outlet comprising:
- a generally cylindrical housing adapted to be mounted within the faucet body in cooperative relation to the inlet and outlet thereof, said housing having at least one opening in the wall thereof through which liquid can flow to the faucet body outlet;
- a valve seat loosely mounted in the bottom inlet end of said housing and having a central passageway therethrough;
- a valve closure member rotatably mounted within said housing above said seat and movable from a first position wherein the passageway is totally closed to a second position wherein the passageway has a maximum opening which communicates with the housing opening;
- said valve seat and said valve closure member having smoothly polished mating surfaces so that liquid pressure acting on the inlet side of the loosely mounted valve seat presses said mating surfaces together to provide a seal therebetween when the valve is in closed position;
- seal means above said valve closure member between said member and said housing; and
- manually operable means connected to said valve closure member for moving the member between its first and second position.

10. A valve for a faucet body as recited in claim 9 wherein:
- said seal means comprises a smoothly polished annular surface on the upper end of said valve closure member and a seal ring permanently secured to the interior wall of said housing to provide a liquid impervious barrier between said ring and said housing, said ring having a smoothly polished annular surface on the underside thereof which contacts and forms a seal with said annular surface of the valve closure member under the pressure exerted thereon by the valve seat and the liquid pressure.

11. A valve for a faucet body as recited in claim 10 wherein:
- said manually operable means has a driving connection with said valve closure member permitting limited relative movement therebetween whereby said valve seat and valve closure member can align with said seal ring with the smoothly polished surfaces on these parts in effective mating and sealing relationship under the force of liquid pressure acting through the bottom inlet end of said housing.

12. A valve for a faucet body as recited in claim 11 wherein:
- said driving connection comprises a female coupling element in the form of a central recess in the upper surface of said valve closure member and a male coupling member on the lower end of said manually operable means drivingly engaged with said female coupling element.

13. A valve for a faucet body as recited in claim 10 wherein:
- said housing provides a cylindrical cavity opening upwardly from the bottom inlet end thereof;
- said seal ring is secured at the upper end of said cavity with the smoothly polished surface thereof facing downwardly;
- said valve closure member includes a cylindrical portion which guidingly cooperates with the cylindrical inner wall of said cavity during rotative movements of said member; and
- said valve seat is received in the lower end of said cavity and carries means thereon engaging with said housing to prevent rotation of said valve seat relative to said housing.

14. A valve for a faucet body as recited in claim 13 wherein:
- said valve closure member has a rectangular portion extending downwardly from said cylindrical portion with the top of said cylindrical portion and bottom of said rectangular portion providing the smoothly polished surfaces on said member; and
- said valve seat has a rectangular opening in the smoothly polished surface that mates with the surface on the rectangular portion of said valve closure member, said rectangular opening being slightly smaller in its dimensions than the dimensions of said rectangular portion.

References Cited

UNITED STATES PATENTS

| | | | |
|---|---|---|---|
| 839,073 | 12/1906 | Miner | 251—175 |
| 2,973,181 | 2/1961 | Johnson | 251—172 |
| 3,009,679 | 11/1961 | Williams | 251—172 |

CLARENCE R. GORDON, *Primary Examiner.*

U.S. Cl. X.R.
251—175, 192